(12) United States Patent
Rozumek et al.

(10) Patent No.: US 6,200,628 B1
(45) Date of Patent: Mar. 13, 2001

(54) USE OF INORGANIC PARTICLES AND METHOD FOR MAKING AND IDENTIFYING A SUBSTRATE OR AN ARTICLE

(75) Inventors: Olivier Rozumek, St. Martin; Edgar Müller, Lausanne, both of (CH)

(73) Assignee: SICPA Holding S.A., Prilly (CH)

( * ) Notice: Subject to any disclaimer, the term of this patent is extended or adjusted under 35 U.S.C. 154(b) by 0 days.

(21) Appl. No.: 09/166,145

(22) Filed: Oct. 2, 1998

(30) Foreign Application Priority Data

Dec. 29, 1997 (EP) .................................................. 97811029

(51) Int. Cl.7 ............................... B05D 1/12; B41M 3/14
(52) U.S. Cl. ................................ 427/7; 427/8; 427/205; 427/201; 427/197
(58) Field of Search ................................. 427/7, 8, 201, 427/180, 205, 197; 252/408.1; 428/148, 143, 240, 242, 325, 328, 332, 323

(56) References Cited

U.S. PATENT DOCUMENTS

| | | | |
|---|---|---|---|
| 3,001,887 | * 9/1961 | Ahlm, Jr. et al. | 427/7 |
| 3,772,200 | * 11/1973 | Livesay | 252/645 |
| 4,053,433 | * 10/1977 | Lee | 252/408 |
| 4,183,989 | * 1/1980 | Tooth | 427/7 |
| 4,329,393 | 5/1982 | LaPerre et al. | 428/325 |
| 4,387,112 | * 6/1983 | Blach | 427/7 |
| 5,670,239 | 9/1997 | Hampp | 428/195 |
| 5,811,152 | * 9/1998 | Cleary | 427/7 |

FOREIGN PATENT DOCUMENTS 26 51 528   5/1977   (DE) .

* cited by examiner

*Primary Examiner*—Marianne Padgett
(74) *Attorney, Agent, or Firm*—Shoemaker & Mattare, Ltd.

(57) ABSTRACT

The present invention relates to inorganic particles comprising at least two chemical elements in a predefined and analytically identifiable ratio. These particles are used as a marking means incorporated into or applied onto any desired article. They provide a high security potential against counterfeiting since the analysis depend on a combination of spatial as well as of chemical information. In a first step the information containing particle has to be localized by scanning electron microscopy and in a second step the ratio of elements is analysed using energy—or wavelength—dispersive X-ray analysis (SEM/EDX).

9 Claims, 7 Drawing Sheets

| | SEM/EDX analysis of marking composition (bulk material) | SEM/EDX analysis of 1% of marking composition in printed intaglio ink I | SEM/EDX analysis of 1% of marking composition in printed intaglio ink II | SEM/EDX analysis of 1‰ of marking composition in printed intaglio ink II |
|---|---|---|---|---|
| $Y_2O_2S$ | 47.43 | 43.35 | 44.03 | 47.22 |
| $Nd_2O_2S$ | 13.17 | 14.42 | 15.72 | 13.07 |
| $Gd_2O_2S$ | 22.72 | 27.14 | 25.11 | 24.59 |
| $Er_2O_2S$ | 9.29 | 9.17 | 8.34 | 10.66 |
| $Yb_2O_2S$ | 7.40 | 5.91 | 6.81 | 4.46 |
| | 100.01 | 99.99 | 100.01 | 100.00 |

USE OF INORGANIC PARTICLES AND METHOD FOR MAKING AND IDENTIFYING A SUBSTRATE OR AN ARTICLE

This invention relates to the use of inorganic particles which comprise at least two chemical elements in a predefined and analytically identifiable ratio, a method for tagging a substrate and to a method of tagging and identifying a substrate and/or an article.

Encoded micro-particles whose code is represented by at least three visually distinguishable coloured layers of organic resins and their use as tag and/or security feature in order to prevent counterfeiting of articles have already been described in DE 26 51 528 and U.S. Pat. No. 4,329,393. Originally, these particles have been developed to allow tracing of explosives from production to detonation. These tags are sold under the trade name Microtaggant or Microtrace.

As the colour sequence of the layers is the only coding feature, particle size and material selection limits the application of these tags. Particle size below 30 $\mu$m is a necessary requirement for many applications, particularly printing inks and related products. Highly resolved lines and figures are difficult to produce with printing inks containing particles larger than the printed feature itself. Particles made of organic laminate can hardly be ground down to sizes in the desired range.

A further disadvantage of these organic particles is their lack of heat resistance. This results in the destruction of a tagging or security element when the article is exposed to fire or heat.

U.S. Pat. No. 5,670,239 discloses a composition for the delocalized marking of articles, which makes the forging or improper exploitation of these articles difficult. The composition contains non-ubiquitous chemical elements, i.e. more or less rare elements from the main- and sub-groups of the periodic system. In particular these are elements which have an x-ray $K_\alpha$ line in the range between 3.69 keV and 76.315 keV and which may be present either in elemental form or in the form of any desired compound.

The elemental compositions and their concentrations serve as delocalized stored information which cannot be discerned with the naked eye. An information item, e.g. an encrypted numerical code or a number/letter combination, can be represented by a set of specific elements or compounds, where each specific element or compound represents a digit of the code, and the concentration of the element or compound expresses the value of that digit, e.g. the figure or the letter. If a specific element or compound belonging to the set is absent from the composition, then the value of the corresponding digit is zero or blank.

U.S. Pat. No. 5,670,239 shows several shortcomings. This marking method requires in any case the retrieval of precise concentrations for the marking composition components in the marked bulk materials, coatings or printing inks. This depends on a homogenous distribution of the marking components which are provided generally as solution. Finding compounds of all desired elements which dissolve homogenously in a coating composition over the whole required concentration range without forming precipitates is rather difficult.

Also the use of mixtures of solid state materials is precluded due to their inherent tendency to segregate according to particle size, specific gravity, etc..

An additional disadvantage is the restricted range of coding possibilities, since each specific chemical element or compound can only represent a n-valued digit of the code. The total coding capacity for m specific elements is therefore given by $n^m$. The restricted coding capacity is due to the fact that in a delocalized coding system only chemical information is evaluated. The code may thus be broken by any sufficiently sensitive analytical method which is able to yield quantitative results, i.e. classical elementary analysis, X-ray fluorescence, Laser-Ablations-ICP-MS etc.. That makes the decoding and reverse-engineering for any potential counterfeiter easy.

A further disadvantage of the teaching of U.S. Pat. No. 5,670,239 is the sensitivity of the encryption to perturbing elements. One or more of the elements used for the encryption may accidentally be present for another reason in or on the marked object. This will impede a proper readout of the encoded digit. Perturbation of other security systems can, vice versa, occur by the presence of this type of encoding, in particular if soluble compounds of rare-earth ions are employed, which are often luminescent in the visible or infrared domain of the spectrum. This kind of interferences are likely to occur with security documents, where a plurality of security systems has to be combined.

It is therefore an object of the present invention to provide marking means which do not show the drawbacks of the prior art and which are particularly suitable for application on security documents.

It is a further object of the invention to provide a reliable forensic tool for marking articles against counterfeiting or improper use.

Another object of the invention is to provide marking means which are compatible with the existing security systems, especially those which are in use on security documents and which serve for their automated machine recognition.

Another object of the invention is an increase of the coding capacity.

Another object of the invention is to provide an encryption which makes the reverse-engineering difficult and which can not be broken by most of the commonly available analytic tools.

Another object of the invention is to provide marking means which are insensitive to perturbing elements.

Another object of the present invention is to provide marking means which do not depend on the formation of homogeneous mixtures with the base material or materials of the article, or with the coating or printing ink to be marked.

These objects were solved by the features of the independent claims.

Particulary they were solved by the use of at least one type of inorganic particle comprising at least two chemical elements in a predefined and analytically identifiable ratio as a marking means.

These particles are introduced into or applied onto the article as a marking mean. The specific ratio of elements in that inorganic particle, which is characteristic for each type of particles, represents a code, or part of a code.

The information containing particles can be localized by scanning electron microscopy (SEM) using backscattered electron detection.

Thus the sites, i.e. the particles where information is contained, must be localized in a first step. Subsequent to the localizing of the information containing particle, the ratio of chemical elements being comprised in that particle can be determined by energy- or wavelength-dispersive x-ray analysis (EDX). Both steps, i.e. the localizing of a particle and its analysis are performed on the same SEM equipment. The proper decoding of the marking according to the present invention is tied to analytical methods combining both, microscopy for the localizing, and elemental analysis for the reading of the code. By concentrating the coded information to at least one localized particle, the information retrieval is not dependent on homogeneous mixing. For the reading of such markings SEM/EDX is the best practicable method today. For SEX/EDX, a particle volume in the order of 0.01 $\mu m^3$ is sufficient to be properly read.

A further beneficial property of the SEM/BDX analysis method is its dependency upon standards in order to get reliable quantitative results. The quantity of an element present in a particle is determined from the intensity of its characteristic X-ray emission. This latter, however, depends upon the precise excitation conditions i.e. the energy of the exciting electron beam. As the energy of the exciting beam is more or less attenuated in function of the density of the material, the analysis must be performed against standard materials of similar chemical nature. In the absence of such standards, the quantitative results can be quite wrong. In security applications, the standards and their exact compositions are known to the owner of the marking, but not to the counterfeiter. The counterfeiter must therefore rely on indirect evidence, and will therefore not be able to copy the marking, even if he had at his disposition an SEM/EDX equipment and a performing materials synthesis facility.

The marking particles can contain any chemical element. Particularly useful are elements of the second half of the periodic table as they facilitate the localization of the particle on the SEM. However, for coding purposes, one can use any element with an atomic number of at least five. Those elements are readable by the above mentioned detection and analysing devices.

The encoding compounds used in the present invention are preferably chosen among the non-stoichiometric crystalline compounds or among the different types of glasses. Not with quite the same security potential, however satisfying for selected applications, are stoichiometric crystalline compounds. Stoichiometric compounds are such which do only exist in a defined elemental ratio. Calcium carbonate ($CaCO_3$) Quartz ($SiO_2$), Baryte ($BaSO_4$), etc. are examples of stoichiometric compounds.

Non-stoichiometric crystals are solids with a microscopically ordered structure, i.e. the atoms are arranged in a regular fashion, called the crystal structure. Certain crystal structures are quite tolerant towards replacement of one type of atom by another without the need for changes in their microscopic order, given that certain general rules like atom sizes and charge neutrality are respected. Examples of such structure types are the spinels ($AB_2O_4$) the garnets ($A_3B_2C_3O_{12}$ or $A_3B_5O_{12}$), the perovskites ($ABO_3$), the lanthanide oxysulphides $(Y,Ln)_2O_2S$, the zircones ($ABO_4$) etc. Here A,B,C stand for the different types of sites encountered in the crystal structure; these sites must be occupied by corresponding metal ions. Ln stands for the lanthanide series, i.e. elements 57 to 71. A given site in all these structures may be occupied either by a single type of metal ion, or by a mixture of different types of chemically similar metal ions. For example, the compounds $Fe_3O_4$, $ZnFe_2O_4$, $(Zn_xCo_{1-x})Fe_2O_4$ and $Co(Fe_{2-x}Al_x)O_4$ all posess the spinel structure. The parameter x in certain of these formulas may be freely chosen, i.e. one or more concentration ratios exist which are not prescribed by stoichiometry. The present invention relies heavily on the existence of this type of compounds for the realization of suitable information containing particles.

Glasses are non-crystalline solid state materials, characterized by the absence of microscopic order. At the atomic level, the structure of a glass resembles that of a liquid. One could therefore describe a glass as being an extremely viscous liquid at room temperature. The composition of a glass can be changed to a large extent; and a great variety of additional metal ions can be introduced (dissolved) into the glass forming base material. Such glass formers are known in the field of oxides ($B_2O_3$, $SiO_2$, etc.), of fluorides ($BeF_2$, etc.), of nitrides, etc.. Glass compositions are non-stoichiometric per definition, as they do not have a crystal structure with respect to which stoichiometry could be defined. The only limiting factor in glass formation is solubility, i.e. if all desired constituents are able to mix up homogeneously in a single melt and to stay so during cooling down. Very exotic glasses are feasible for marking purposes in the present invention, e.g. glasses containing Si, Ge, Al, La, Ta, Er and O in various elemental ratios. Glasses can be ground to the desired particle size, although such grinding requires enhanced technology, if very fine particles in the order of 3–5 $\mu m$ are to be achieved.

In another embodiment the particle is of metal alloy such as alnico, brass, bronze, etc..

All types of particles can either be used exclusively or in any desired combination.

One embodiment of the present invention is that the information containing particle consists of superposed layers which comprise the chemical elements in non-stoichiometric or stoichiometric form.

The inorganic particles can be of any shape, including irregularly formed as well as regularly formed particles. The size of said particles is substantially in a range of between 0.1 to 30 micrometers, preferably in a range of between 0.5 to 10 micrometers and even more preferably in a range of between 1 to 5 micrometers. Substantially means that 80% or more of the total weight of the material falls within the range. The volume of the individual particles is substantially comprised within the range between 0.01 $\mu m^3$ to 10000 $\mu m^3$, preferably within the range of between 0.1 $\mu m^3$ to 1000 $\mu m^3$, more preferably within the range of between 1 $\mu m^3$ to 100 $\mu m^3$.

The inorganic particles of the present invention can be blended into any carrier medium which is able to form stable dispersions of said particles and to hold the particles in place for localization and analysis. Preferably those particles are blended into any kind of coating composition and printing ink which are applied onto any kind of substrate to be marked. In a preferred embodiment, if the coding has to remain invisible to the human eye, the film forming carrier medium is chosen to be transparent in the visible range of the electromagnetic spectrum. In a further application mode, the particles are incorporated into bulk materials which thereafter will obtain their desired form by extrusion, casting, injection moulding, rolling, etc.. Coating compositions or printing inks comprising said particles can be applied to the underlying substrate by any of the known techniques. These include spraying, brushing, dipping, printing. Printing can be performed e.g. by intaglio, gravure, offset, silkscreen, letterpress, flexography and related techniques.

The information containing particles can also be incorporated into powder coating compositions, toners, etc., as well as into paper, security foils, plastic sheets and into fibre, in particular for valued papers, banknotes, checks, etc., and for security documents, passports, driving licences etc.. They can furthermore be used in credit cards, ID-cards, access cards and all other type of cards conferring a right or carrying a value.

The useful amount of particles necessary for a reliable detection and analysis ranges from 0.0001% to 10%, preferably from 0.001% to 1% and even more preferably from 0.01% to 0.1% by weight of the total weight of the overall composition or material to which it is added.

The protection against counterfeiting is enhanced when said particles additionally have luminescence-, magnetism-, IRabsorption-, radio frequency- and/or microwave resonance-properties. Coating compositions and/or printing inks can be applied to any security document to prevent counterfeiting or unauthorized trade and use of said document.

The reading of the codes according to he present invention can be done with any currently available scanning electron microscope (SEM), foreseen that it is equipped with a backscattered electron detector and an energy—or wavelength—dispersive X-ray detector. The data of the examples below stem from three different instruments (a LEO 435VP, a Philips XL30W and a Hitachi S-3500N), which could be used indiscriminately for the same purpose.

In scanning electron microscopy, the sample is scanned by a very fine focused electron beam, of 5 to 10 nm spot size and 1 to 30 kV electron energy. When this primary beam hits the sample, different types of secondary radiation are produced which can be detected with the help of appropriate devices. A plot of the corresponding detector intensity as a function of the scanning electron beam's co-ordinates yields the SEM picture. Depending upon the electron energy and the sample density, the primary beam penetrates more or less into the sample material. For example, a beam of 20 keV penetrates about 5 to 8 $\mu$m into an organic ink matrix.

The most important types of secondary radiation are:
(i) Secondary electrons, i.e. electrons of the sample material which are ejected after collision with electrons of the primary beam. Secondary electrons have low energies (lower than 50 eV), and can therefore only escape from the very surface of the sample. As a consequence, secondary electron detection yields a surface topographic image of the sample ("topographic contrast").
(ii) Backscattered electrons, i.e. electrons of the primary beam which are scattered at the nuclei or cores of the sample atoms. Backscattered electrons have high energies, close to the energy of the primary beam, and can escape from the whole penetrated sample volume. As the electron scattering power of an atom increases with its atomic number, backscattered electrons yield an image of the chemical nature of the sample ("chemical contrast").
(iii) X-rays, resulting from the refilling of the sample atoms' vacant electron shells after collisions with electrons of the primary beam. Each atom emits its characteristic X-ray spectrum, consisting of K, L, M, etc. line series, which can be used to conclude to the presence of a certain chemical element in the sample, as well as to determine its relative amount, if a comparison standard is available. The intensity of the received X-ray emission depends noteworthy upon the energy of the exciting primary electron beam, as well as upon the presence of X-ray absorbing material in the ray path. As a general rule, the scanning electron beam energy has to be about at least the double of the energy of the emission lines to be observed, and emission lines with energies lower than 2 keV will already suffer absorption losses in an organic ink matrix. A usual primary beam energy in SEM work is 20 keV. Under these conditions, elements up to about bromine (atomic number 35) can be determined preferably on their K-lines, whereas the elements from rubidium to bismuth (atomic numbers 37 to 83) have to be determined preferably on their L-lines. For the heavier elements of the latter group, the M-lines are also of some interest, and they serve preferably for the determination of the actinides. For the calculation, the peak areas of the K-, L- and M-line series are separately integrated and taken into account according to the device-specific calculation methods.

The following figures and examples will further explain the present invention which, however, is not limited to them.

In FIGS. 1 to 4 the localizing of information containing particles on a SEM, using backscattered electron detection, is shown. The inorganic particles in these cases had the composition $(Y_{(2-u-v-w-x)}Nd_u Gd_v Er_w Yb_x) O_2S$.

Figure 1:
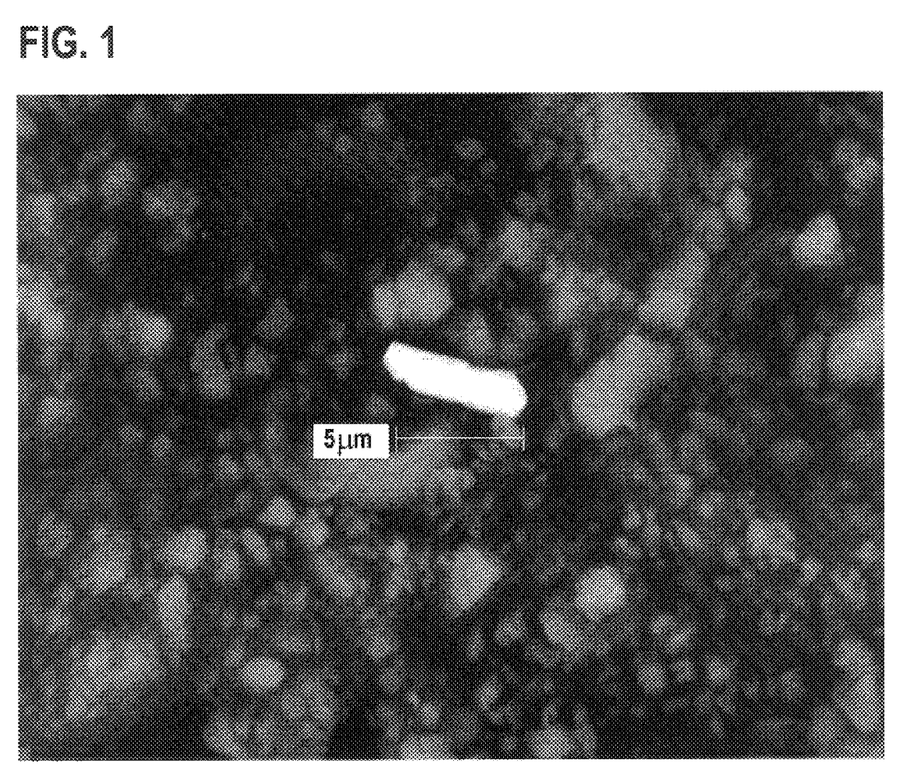
FIG. 1 shows a SEM picture of a crystalline non-stoichiometric inorganic information containing particle of the present invention, incorporated in a printed intaglio ink, under backscattered electron detection ("chemical contrast")
Figure 2:
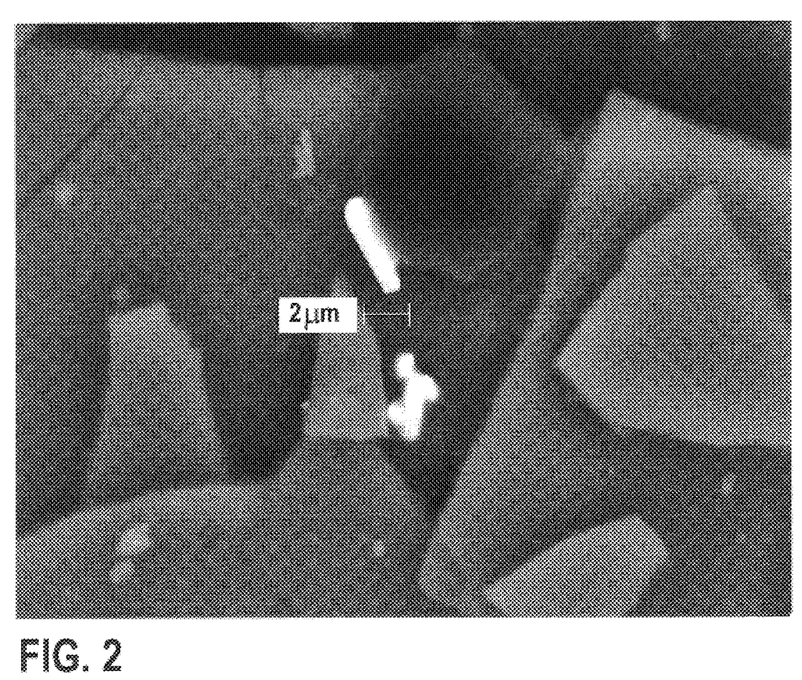
FIG. 2 shows a SEM picture of several crystalline non-stoichiometric inorganic information containing particles of the present invention in a printed optically variable silk screen ink.
Figure 3:
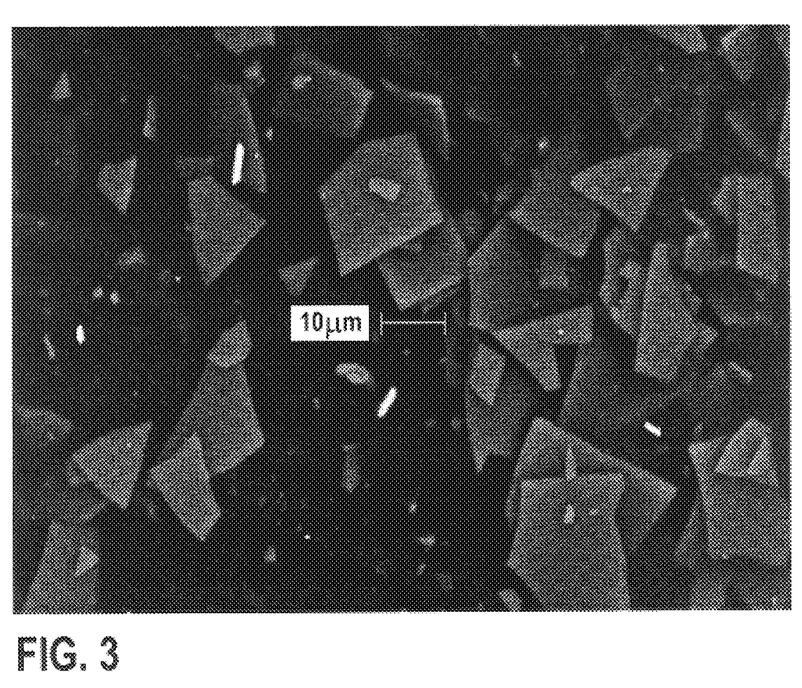
FIG. 3 shows a SEM picture of the same particles as in FIG. 2 in a printed optically variable intaglio ink.
Figure 4:
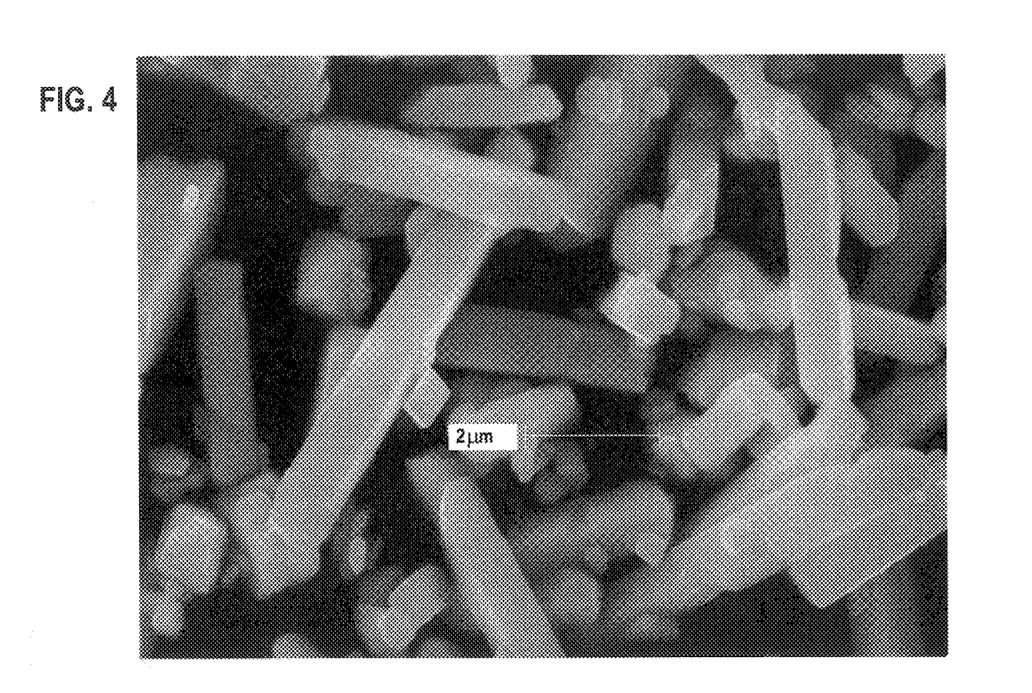
FIG. 4 shows a SEM picture of a bulk quantity of crystalline non-stoichiometric inorganic information containing particles, visualized by backscattered electron detection.
Figure 5:
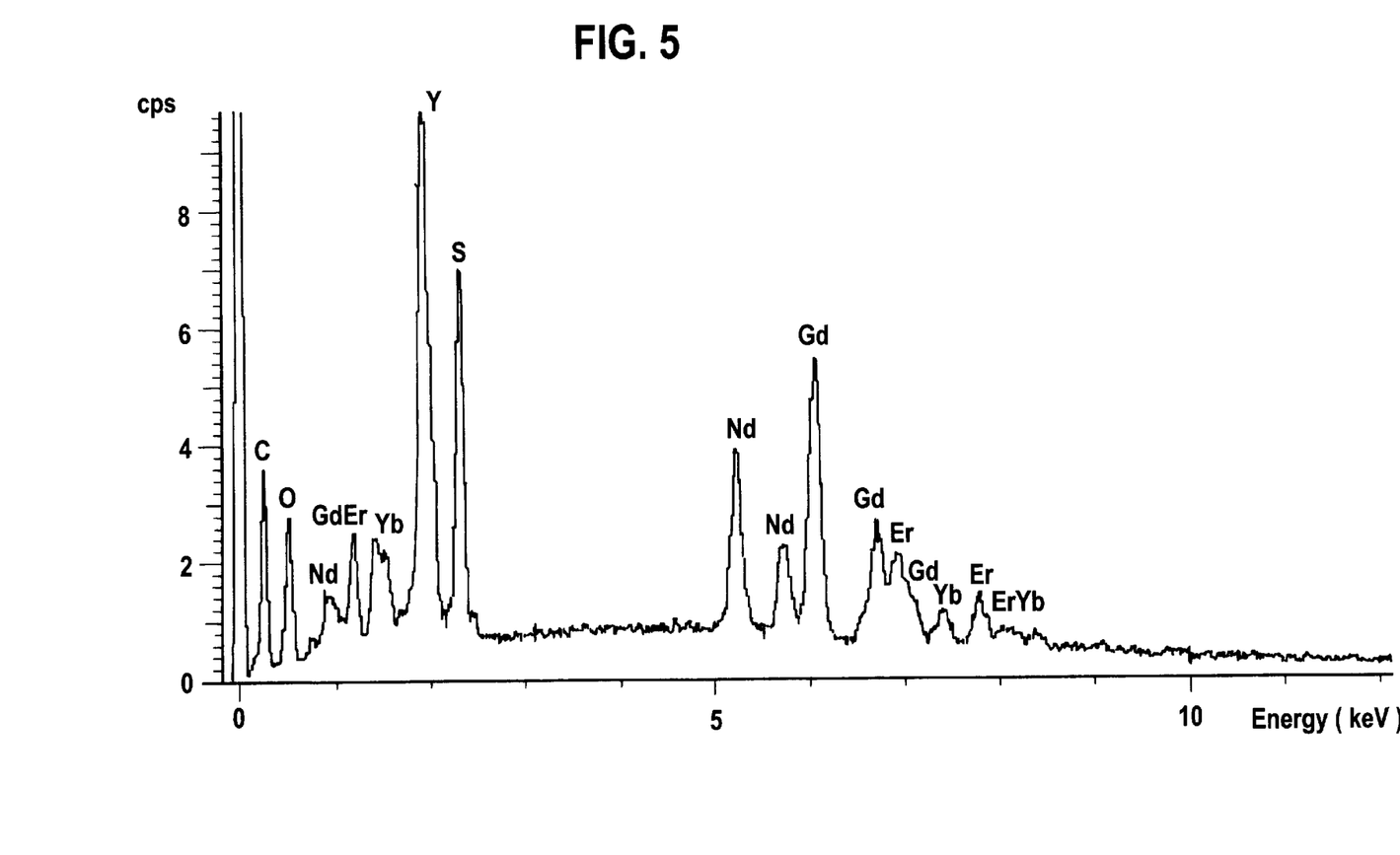
FIG. 5 shows the energy dispersive X-ray spectrum of one of the crystalline non-stoichiometric particles localized in FIG. 2.
Figure 6:
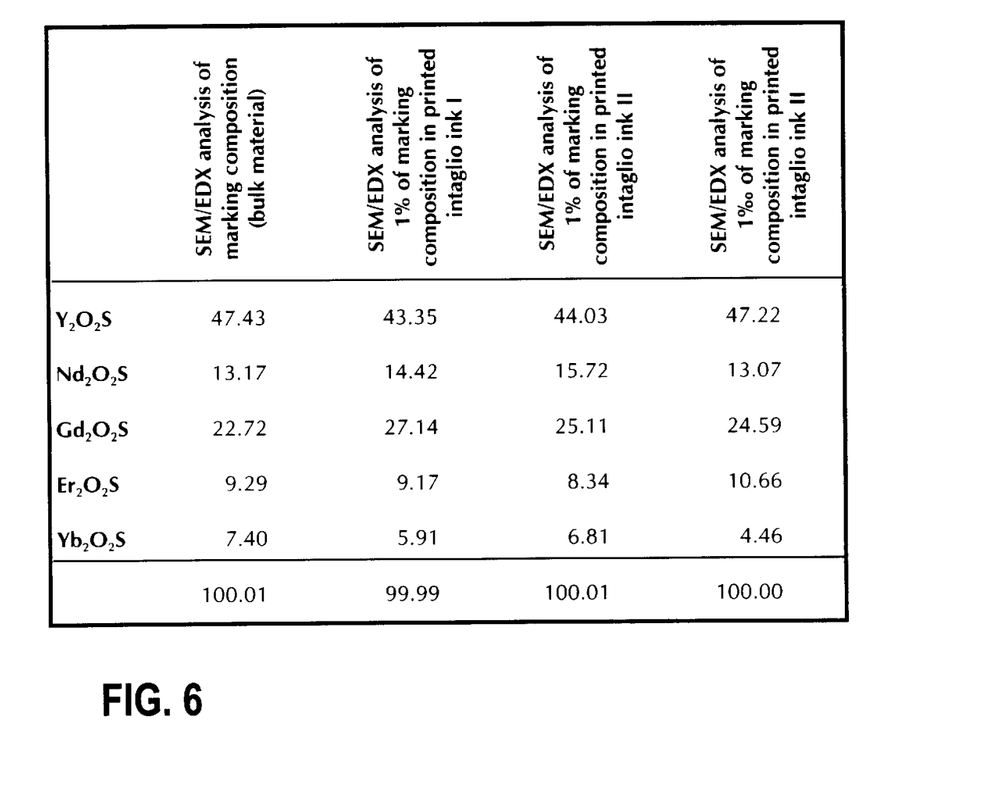
FIG. 6 shows a table of SEM/EDX analyses, obtained on inorganic particles according to the invention.
Figure 7:
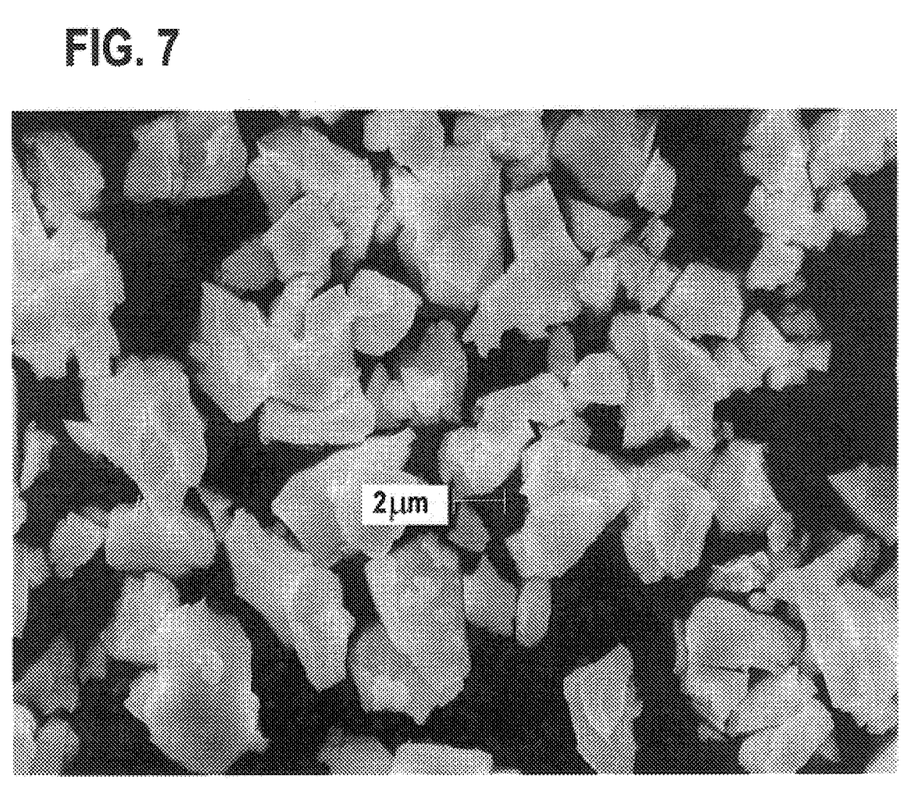
FIG. 7 shows a SEM picture of inorganic information containing particles of the glass type, according to the present invention.
Figure 8:
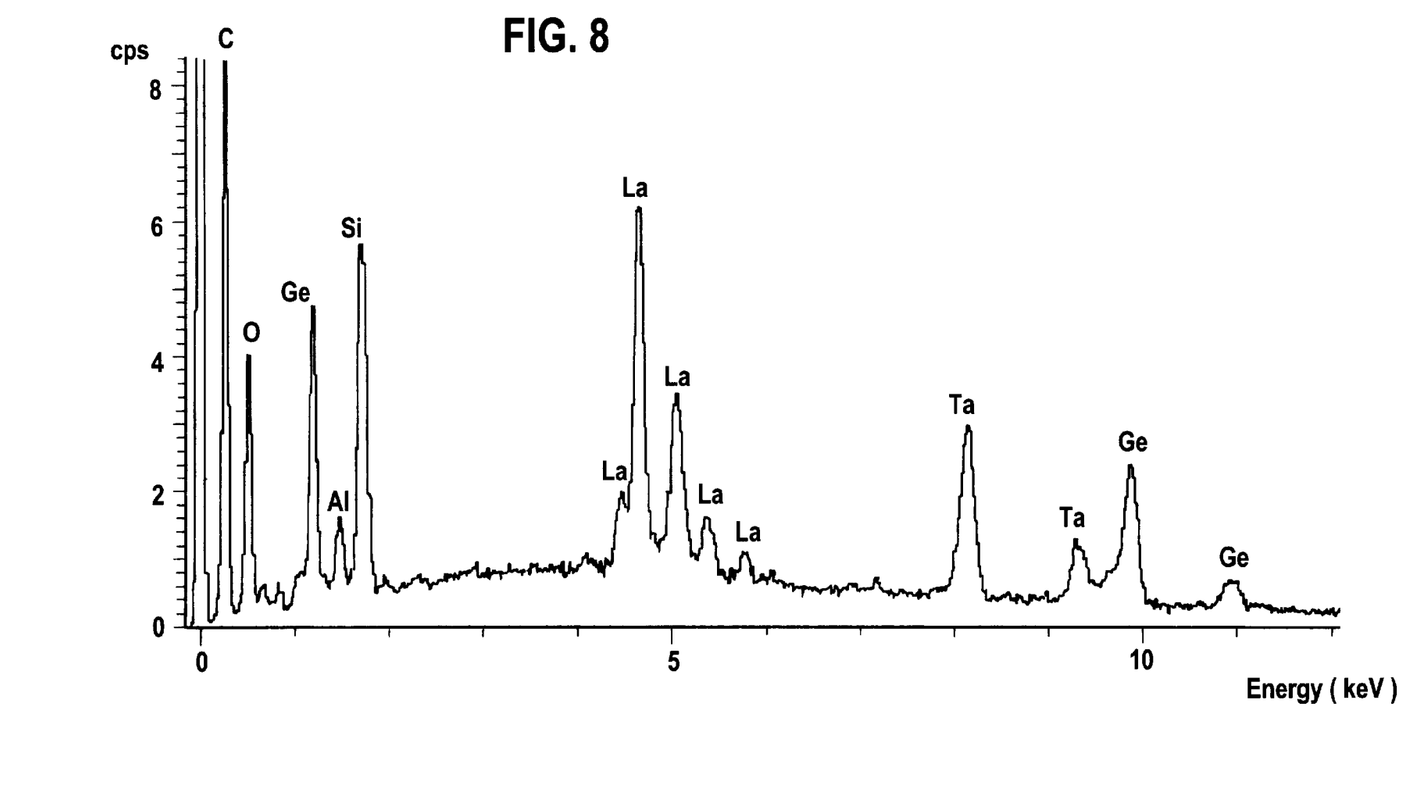
FIG. 8 shows the energy dispersive X-ray spectrum of one of the particles of FIG. 7. The chemical composition is $(GeO_2\text{-}SiO_2\text{-}La_2O_3\text{-}Er_2O_3\text{-}Ta_2O_5)$.

FIG. 6 shows a table of SEM/EDX analyses, obtained on inorganic particles according to the invention. The first column shows SEM/EDX results, as obtained on the neat particle of FIG. 4, using the instrument's internal standardisation and algorithms against the elemental ratio of the standard particle which will only be available to the owner of said standard. Columns 2,3 and 4 show SEM/EDX owner of said standard. Colums 2,3 and 4 show SEM/EDX results for each an individual crystal of the marker, present at concentrations of 1% and 0.1%, respectively, in two different intaglio inks. These analyses were performed on customary printing of these inks.

The enhanced coding capacity of this type of marking according to the present invention, as well as its resistance to perturbing elements and to reverse-engineering attempts, will be illustrated with the help of the following examples:

EXAMPLE;

Encoding particles P1: $(Y_{1.6}Nd_{0.2}Gd_{0.2})O_2S$
Encoding particles P2: $(Y_{1.0}Gd_{0.6}Yb_{0.4})O_2S$
Encoding particles P3: $(Y_{1.3}Nd_{0.1}Gd_{0.4}Yb_{0.2})O_2S$
Camouflaging material C1: $La_2O_3$
Camouflaging material C2: $Gd_2O_3$ An encoding realised with a 1:1 mixture of P1 and P2 can be distinguished, according to the present invention, from an encoding realised with P3. U.S. Pat. No. 5,670,239 would not distinguish between both cases. This illustrates the higher coding capacity of the marking means according to the present invention.

An encoding realised with an 1:1 mixture of P1 and the camouflaging material C1 is easily decoded, according to the present invention, as having the element ratio $(Y_{1.6}Nd_{0.2}Gd_{2.0})$; it is indeed sufficient to localize one crystal of the $(Y_{1.6}Nd_{0.2}Gd_{0.2})O_2S$ particle and to analyse it. Since U.S. Pat. No. 5,670,239 would additionally consider the $La_2O_3$, it would conclude to an overall element ratio of $(La_{1.0}Y_{0.8}Nd_{0.1}Gd_{0.1})$ in this case. This would also be the compositional ratio obtained with classical elementary analysis, X-ray fluorescence, Laser-Ablation-ICP-MS, etc.) which illustrates the higher resistance against reverse-engineering of a marking means according to the present invention.

The same is true for an encoding realised with a mixture of P1 and the camouflaging material C2. SEM/EDX is still in a position to properly read the coding, whereas other analytical methods will result in a totally wrong gadolinium content. This illustrates the robustness of the coding according to the present invention against perturbing elements, which may be present for another reason in or on the coded article. On the other side camouflaging material can purposely be added to mislead any potential counterfeiter.

What is claimed is:

1. A method of marking and authenticating an item, said method comprising steps of applying to said item a marking comprising at least one particle of a non-stoichiometric crystalline compound containing at least two chemical elements in a predetermined known ratio, and subsequently authenticating the item by locating said particle on said item, and then analyzing the particle to determine whether it contains said elements, in said predetermined ratio.

2. The method of claim 1, wherein the particle is located using back scattered electron detection.

3. The method of claim 1, wherein the particle is incorporated in a coating composition before being applied to said item.

4. The method of claim 3, further comprising a step of adding at least one camouflaging compound to said coating, said camouflaging compound containing at least one of said chemical elements.

5. The method of claim 1, wherein said crystalline compound has a garnet structure.

6. The method of claim 1, wherein said crystalline compound has a spinel structure.

7. The method of claim 1, wherein said crystalline compound has a perovskite structure.

8. The method of claim 1, wherein said crystalline compound has a zircon structure.

9. The method of claim 1, wherein the crystalline compound is selected from the group consisting of oxysulfides of rare-earth elements and oxysulfides of yttrium, and combinations thereof.

* * * * *